Nov. 4, 1969  K. WILFERT  3,476,402
INFLATABLE CONTAINER FOR THE PROTECTION OF PASSENGERS
OF VEHICLES, ESPECIALLY OF MOTOR VEHICLES, AGAINST
IMPACT INJURIES IN CASE OF COLLISIONS
Filed Aug. 3, 1967
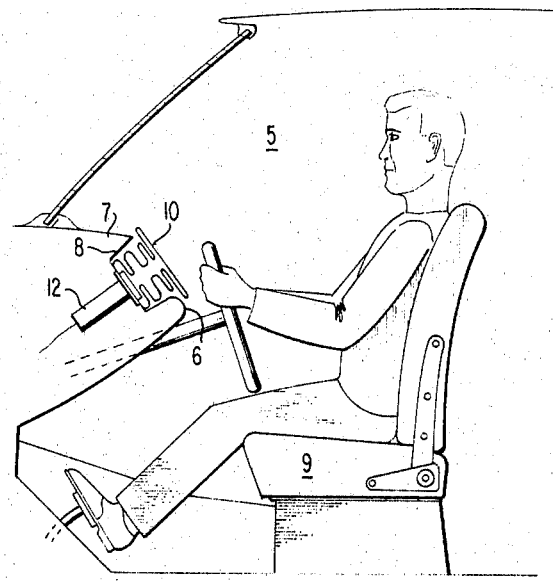
FIG. 1
FIG. 3
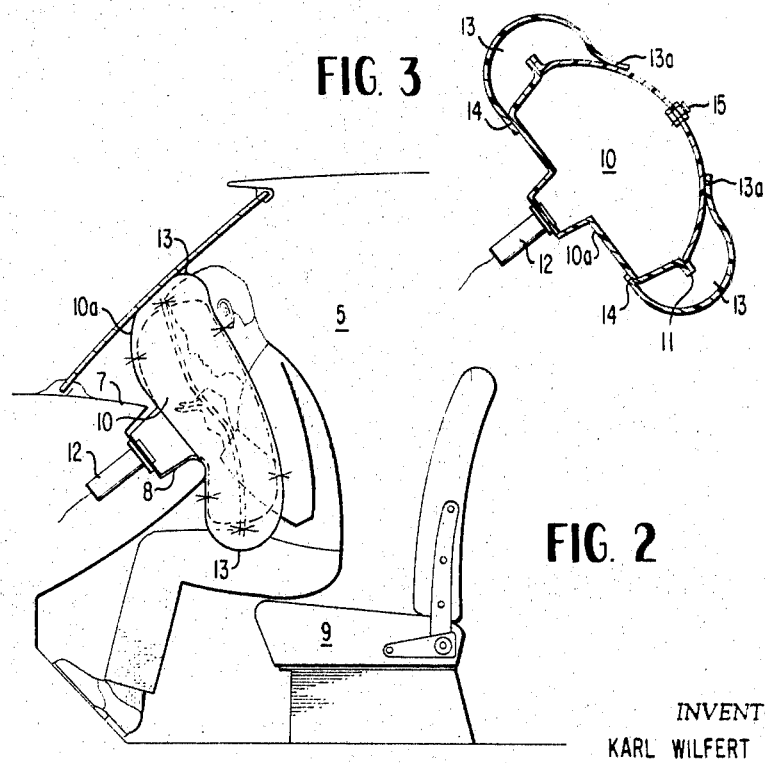
FIG. 2
INVENTOR
KARL WILFERT
BY Craig & Antonelli
ATTORNEYS United States Patent Office 3,476,402
Patented Nov. 4, 1969

3,476,402
INFLATABLE CONTAINER FOR THE PROTECTION OF PASSENGERS OF VEHICLES, ESPECIALLY OF MOTOR VEHICLES, AGAINST IMPACT INJURIES IN CASE OF COLLISIONS
Karl Wilfert, Gerlingen-Waldstadt, Germany, assignor to Daimler-Benz Aktiengesellschaft, Stuttgart-Unterturkheim, Germany
Filed Aug. 3, 1967, Ser. No. 658,235
Claims priority, application Germany, Aug. 3, 1966, D 50,750
Int. Cl. B60r 21/10, 21/02
U.S. Cl. 280—150            6 Claims

ABSTRACT OF THE DISCLOSURE

A container which is adapted to be inflated by a gas mixture developed by an explosion, for the protection of the passengers of motor vehicles against impact injuries, in which the main container consists of at least two parts connected with each other by one or several seams and which is provided with at least one equalization chamber enclosing one or several of the connecting seams.

BACKGROUND OF THE INVENTION

The present invention relates to the construction of a container inflatable by an explosively developed gas mixture, which is arranged for the protection of the passengers of vehicles, especially of motor vehicles, at the fixed walls, for example, at the instrument panel endangered principally during impacts. During collisions with other vehicles or fixed objects, such as building parts, fixed walls, masts, trees or the like, the vehicle passengers are thrown, for example, forwardly and impinge for the most part with the head, for example, against the instrument panel, whereby they frequently suffer fatal injuries.

A known safety measure intended to alleviate this dangerous situation consists in that an expansible container is filled with an explosively developed gas mixture at the instant of the impact by initiation or release of an electric ignition and expands between the upper body of the forward vehicle passengers and the instrument panel.

However, the container material is particularly highly stressed at the instant of its explosion-like filling, especially at the places of the seams.

SUMMARY OF THE INVENTION

In order to prevent the bursting or exploding of the container, it is proposed according to the present invention to provide the inflatable container, consisting of at least two parts sewn to one another, with at least one equalization chamber surrounding or enclosing the connecting seam or seams. Furthermore, it is of advantage if according to the present invention the seams of the container and of the equalization chamber are in effect disposed seriatim. The connecting seam can then be made according to the present invention with large stitches so that the container in its filled condition is not completely tight.

The edges of the wall of the equalization chamber sewn to the outer sides of the container parts relieve with their seam places or fastening places the annular seam of the two container halves. By placing the seams effectively in series, a premature bursting or exploding of the impact-absorbing container is avoided.

Accordingly, it is an object of the present invention to provide an inflatable container for the protection of the passengers in motor vehicles which is simple in construction yet avoids by extremely simple means the shortcomings and drawbacks encountered with the prior art constructions.

Another object of the present invention resides in an inflatable container for the protection of the passengers in vehicles, especially in motor vehicles, against impact injuries in case of collisions caused by impact against the instrument panel which is so constructed as to increase the safety of the passengers and to minimize the danger of improper operation of the container.

A further object of the present invention resides in an inflatable container for the protection of vehicle passengers of the type described above which effectively protects the seams against the effect of premature bursting due to excessively high loads and stresses.

Still another object of the present invention resides in an inflatable container for the protection of passengers in motor vehicles which prevents a premature explosion or bursting of the container due to strong impacts without prejudice to the desired yieldingness of the containers to implement proper absorption of impact forces.

A still further object of the present invention resides in a passenger protective device for motor vehicles of the type described above which elastically compensates for losses of gas particles escaping at the seams of the container.

These and further objects, features, and advantages of the present invention will become more obvious from the following description when taken in connection with the accompanying drawing which shows, for purposes of illustration only, one embodiment in accordance with the present invention and wherein:

FIGURE 1 is a schematic side elevational view in the forward part of a motor vehicle equipped with a safety device of the present invention;

FIGURE 2 is a schematic side elevational view, similar to FIGURE 1, but illustrating the same in condition of a collision; and FIGURE 3 is a cross-sectional view through the inflated container in accordance with the present invention.

Referring now to the drawing wherein like reference numerals are used throughout the various views to designate like parts, reference numeral 5 indicates in FIGURES 1 and 2, the driver space of a conventional vehicle body. An approximately pot-shaped recess 8 is impressed into the end face 6 of the transversely extending instrument panel 7 within the driver space 5; the pot shaped recess 8 is arranged opposite the seat 9 (FIG. 1). An expansible container 10 is inserted in folded condition into the recess 8.

The container 10 is expanded at the instance of a collision and upon sudden stoppage in an explosion-like manner by a gas mixture and expands over the instrument panel whereby an impact of the driver and/or passenger with the head against the instrument panel is reliably prevented.

The container 10 consists of two parts sewn together at the edges. The container 10 is not completely tight in order to receive a certain yieldingness. For that reason, the seam 11 at the connecting places of the two container halves is realized with large stitches. The container 10 is connected at its forward side 10a with the discharge end of a bottle 12 developing the necessary gases. With a sudden stoppage, the gas developed instantaneously, for example, by a conventional electric inertia or pendulum ignition, flows out of the discharge end of the bottle 12 and inflates the container in a fraction of a second. The subsequent loading by the impact of the driver, who is thrown forwardly with the head, is elastically equalized by the loss of the gas particles escaping at the seam so that the impact movement is effectively braked (FIG. 2).

The container 10, which is approximately rectangularly shaped in plan view, may burst prematurely as a result of a strong impact force and/or an excessively developed gas quantity and/or a faulty wall of the gas container. The tearing takes place for the most part at the endangered seam 11. In order to prevent this bursting itself and/or to prevent the harmful effect thereof, at least one equalization chamber 13 is secured with the free edges 13a thereof of a respective wall to the two mutually connected container halves, approximately at a point of about ⅓ the dimension of the long side, for example, 10a of the inflated rectangular body thereof. (FIG. 3). The walls of the equalization chamber 13 are erected under the pressure of the entering gas particles over the seam 11.

The equalization chamber 13 encases or surrounds the seam 11 and relieves the same. In case of bursting of the inner seam 11 or seams enclosed by the equalization chamber 13, the gas pressure is not able to escape but the impact force is now absorbed by the absorption container 10 enlarged by the equalization chamber 13.

The absorptive effect of the protective container 10 remains preserved shortly before or also during the impact of the body owing to the equalization chamber 13. The danger of bursting at the seam places 14 of the equalization chamber 13 is less by approximately one-half than at the seam 11 of the container walls because one edge each of the wall of the equalization chamber 13 is secured to the continuous wall of the container 10 whereas two container halves are connected at the edges by the seam 11.

A destruction of the absorptive container prior to the impact reduction, properly speaking, is prevented by the container with the equalization chamber according to the present invention. Of course, all of the seams 11 and 14 may be sealed by appropriate gumming, bonding or the like of any conventional nature; however, the container material then has to be still sufficiently stretchable in the inflated condition. For the complete discharge of the container, a discharge valve 15 may be provided on its free side.

While I have shown and described only one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as would be obvious to a normally-skilled workman in the pertinent art.

I claim:
1. In combination with a motor vehicle having a passenger compartment and an instrument panel disposed therein, an inflatable container disposed within said passenger compartment and adapted for inflation by means of gases generated explosively under collision conditions, said container comprising a primary chamber including at least two portions interconnected by primary seam means and an equalization chamber surrounding at least some of said primary seam means, said equalization chamber being connected with said primary chamber of said container along secondary seam means which lie outside of a plane defined by said primary seam means, said primary seam means being constructed so as to permit egress of some of the gas within said primary chamber into said equalization chamber upon impact of a body with said inflatable container in an inflated condition.

2. A combination according to claim 1, wherein said container is approximately rectangularly-shaped in plan view, said equalization chamber being arranged at the narrow side of the rectangle.

3. A combination according to claim 2, wherein the free edges of the walls of said equalization chamber are secured, at said secondary seam means, at the walls of the inflated, approximately-rectangular container at a point about one third of the length of the long sides thereof.

4. A combination according to claim 1, further comprising a recess within said instrument panel, said container being accommodated, in the deflated condition, within said recess.

5. A combination according to claim 4, further comprising means for supplying gas for inflating said container disposed within said recess.

6. A combination according to claim 1, further comprising discharge valve means for effecting deflation of said container, as desired.

References Cited
UNITED STATES PATENTS
| | | | |
|---|---|---|---|
| 1,954,581 | 4/1934 | Wortmann | 220—14 |
| 2,834,606 | 5/1958 | Bertrand | 280—150 |

FOREIGN PATENTS
| | | |
|---|---|---|
| 930,641 | 7/1963 | Great Britain. |

LEO FRIAGLIA, Primary Examiner

J. E. SIEGEL, Assistant Examiner